United States Patent [19]

Olson

[11] 4,308,753
[45] Jan. 5, 1982

[54] LOW-POWER ELECTROMAGNETIC FLOWMETER

[75] Inventor: Jack R. Olson, San Diego, Calif.

[73] Assignee: The United States of America as represented by the Secretary of the Navy, Washington, D.C.

[21] Appl. No.: 99,380

[22] Filed: Dec. 3, 1979

[51] Int. Cl.³ .............................................. G01P 5/08
[52] U.S. Cl. .................. 73/861.17; 73/189; 73/861.13; 73/861.15
[58] Field of Search ........... 73/861.12, 861.13, 861.15, 73/861.16, 861.17, 170 A, 189

[56] References Cited

U.S. PATENT DOCUMENTS

| | | | |
|---|---|---|---|
| 3,523,452 | 8/1970 | Cason | 73/861.16 |
| 4,000,648 | 1/1977 | Olson | 73/861.15 X |
| 4,010,644 | 3/1977 | Bonfig et al. | 73/861.17 |

OTHER PUBLICATIONS

M. Hanff, "Static Electromagnetic Currentmeter", Proceedings of the Conference on Electronic Engineering in Ocean Technology, Wales, U.K. (Sep. 1970), pp. 371–380.

Primary Examiner—Charles A. Ruehl
Attorney, Agent, or Firm—Richard S. Sciascia; Ervin F. Johnston; James O. Skarsten

[57] ABSTRACT

A system for minimizing the power requirement of a flowmeter intended for long-term unattended deployment in a current flowing through a body of conductive fluid. The system includes a pair of electrodes in contact with the fluid, and a permanent magnet which generates a magnetic field which is orthogonal to a line passing between the electrodes. An electromagnetic coil is also provided, and is selectively activated and deactivated to establish the orthogonal magnetic field at a first level during first time periods in a series of first time periods, and at a second level during second time periods in a series of second time periods. The ratio of the time duration of a first time period to a second time period is substantially less than one. Means coupled to the electrodes generate a first signal during a first time period and a second time signal during a second time period, the first and second signals together enabling determination of an error term, comprising the potential difference between the electrodes when the electrodes are in contact with the fluid, and there is no magnetic field proximate to the electrodes.

13 Claims, 4 Drawing Figures

LOW-POWER ELECTROMAGNETIC FLOWMETER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein generally pertains to electromagnetic flowmeters, i.e., devices for measuring the velocity of a current present in a body of liquid or other fluid, wherein a permanent magnet is employed to generate the magnetic field required for flowmeter operation. More particularly, the invention pertains to electromagnetic flowmeters which employ a permanent magnet and which further employ a selectively activated electromagnet to determine a potential difference error term between the electrodes of the meter. Even more particularly, the invention pertains to flowmeters of the above type which minimize power required for the operation thereof, to enable unattended long term deployment in a body of selected fluid.

It is now well known that the velocity $\overline{V}$ of a current present in a body of conductive fluid may be readily determined by (1) inserting a pair of electrodes in the current, and (2) generating a magnetic field B, the electrodes being spaced apart by a distance d, and there being a potential difference E therebetween. From an application of Faraday's law, $e_x = V_y B_z d$, where $e_x$, $V_y$ and $B_z$ are mutually orthogonal components of the vectors E, V and B, respectively. E and B quantities may be readily measured by means of conventional instruments, to enable determination of current velocity.

Devices structured according to the above principles are generally known as electromagnetic flowmeters. In the past, such devices have been used to substantially improve sensitivity in current velocity measurement. Over the years, Applicant has made significant contributions to the electromagnetic flowmeter art, as indicated, for example, by patents granted to him by the United States Patent and Trademark Office for "Electromagnetic Flow Meter", U.S. Pat. No. 3,693,440 issued Sept. 26, 1972, and for "High Sensitivity Flowmeter", U.S. Pat. No. 4,000,648, issued Jan. 4, 1977.

There is growing interest in monitoring currents present in ocean or other salt water bodies, such as bottom currents. For such studies, it is necessary to deploy monitoring instruments at locations which are very remote, and for periods of time on the order of months, or in excess of a year. It is clearly important that the power requirements of monitoring equipment must be minimized, to enable a battery or other power source to provide sufficient power over the deployment period.

An electromagnetic flowmeter is a very useful device for monitoring current velocity. However, in the past, the magnetic field thereof has generally been generated by means of an electromagnetic coil, requiring a power on the order of 10 mw–1 watt. To eliminate a power drain of such magnitude, a flowmeter could alternatively employ a permanent magnet having the capability to provide a sufficient magnetic field for the entire period of deployment. However, when a pair of electrodes of a flowmeter are immersed into a conductive fluid, a potential difference occurs therebetween due to electrical interaction between the electrodes and the fluid. If the magnetic field of a flowmeter is AC, the effects of such potential difference are cancelled out. However, for the DC field provided by a permanent magnet, the relationship between current velocity, magnetic field, and potential difference between electrodes becomes $e = VBd + e_\delta$, where $e_\delta$ is the potential difference due to electrical interaction, hereinafter referred to as an error term. It is clear that velocity V cannot be determined without knowing the value of $e_\delta$.

The Applicant has discovered that by selectively combining a permanent magnet and an electromagnetic coil in an electromagnetic flowmeter, it becomes possible to determine the error term $e_\delta$ while limiting the power requirement of the flowmeter to an amount which is negligible in comparison with the aforementioned range of 10 mw–1 watt. Applicant thereby provides an electromagnetic flowmeter which is well suited for monitoring current velocity at a remote location in a selected fluid body for long-term periods. However, the invention disclosed and claimed herein is not intended to be limited to apparatus or structure intended for such purpose.

SUMMARY OF THE INVENTION

In the present invention, apparatus is provided for enabling determination of error term $e_\delta$, the apparatus including a selected number of electrodes for contacting a moving body of conductive fluid, two of the electrodes, comprising an electrode pair, being spaced a selected distance from one another. A permanent magnet means is also included for generating a magnetic field having a component which is in orthogonal relationship with a straight line passing between the electrodes of the pair, and an electromagnetic means selectively varies the orthogonal magnetic field component. Operating means coupled to the electromagnetic means activates the electromagnetic means during each period in a series of first time periods to establish the magnetic field component at a first level, and also deactivates the electromagnetic field during each period in a series of second time periods to establish the magnetic field component at a second level. The ratio of one of the first time periods to one of the second time periods is substantially less than one, so that very little power is required to activate the electromagnetic means, even over a very long series of first time periods. Means coupled to the electrodes of the pair generates first signals during first time periods and second signals during second time periods, the first and second signals enabling the value of error term $e_\delta$ to be readily computed.

Preferably, the electrodes of the pair are immovably positioned in relation to the velocity of the moving body of conductive fluid so that a component of the velocity is orthogonal to the line passing between the electrodes of the pair. Preferably also, the permanent magnet means comprises a permanent magnet of selected configuration which is fixed in selected relationship with the electrodes of the pair to generate a magnetic field component such that the magnetic field component, the velocity component and the line between the electrodes are mutually orthogonal. The electromagnetic means preferably includes an electromagnetic coil for selectively providing a supplementary magnetic field having a component which is likewise orthogonal to the velocity component and the line. The operating means preferably comprises a voltage source and a timing switch for coupling the coil and source during first time periods, and for uncoupling them during second time periods.

In a preferred embodiment of the invention, the electrodes are deployable in the path of a current flowing through a selected salt water environment and the timing switch comprises means for connecting the electromagnetic coil and the voltage source for first time periods which are on the order of a minute, and for disconnecting the coil and the source for second time periods which are on the order of a plurality of hours. The voltage source comprises a battery means for storing sufficient power to activate the electromagnetic coil during each first time period in a series of first time periods continuing over a current monitoring time period which is on the order of a year, the battery means being deployable in the salt water environment during the current monitoring time period. The means receiving the first and second signals usefully includes a means for recording all of the first and second signals generated during the current monitoring period.

Alternatively, Applicant's invention may be recited as a method for determining the velocity of a current flowing through a selected fluid environment, such method comprising the steps of: placing a pair of electrodes in contact with the fluid so that a line passing between the electrodes is orthogonal to the direction of current flow; deploying a permanent magnet to generate a magnetic field such that the line between the electrodes, the direction of current flow, and the magnetic field are mutually orthogonal; periodically activating an electromagnetic coil for brief intervals to generate a supplementary magnetic field which is orthogonal to both the line and current flow direction, the duration of an activation interval being substantially less than the duration of a period between activation intervals; and employing both the potential difference between the electrodes during an activation interval, and the potential difference therebetween during a period between activating intervals, to determine current velocity.

OBJECTS OF THE INVENTION

An object of the present invention is to substantially reduce the power required to operate an electromagnetic flowmeter.

Another object is to substantially reduce the power requirement of an electromagnetic flowmeter which is deployed to monitor velocity of a current in an ocean or other salt water body.

Another object is to provide an electromagnetic flowmeter which employs a permanent magnet to enable unattended deployment of the flowmeter for long term periods which may be on the order of a year.

Another object is to provide apparatus for monitoring current flow in a conductive fluid, wherein an electromagnetic coil is periodically activated for brief intervals to determine the potential difference between electrodes of the apparatus in the absence of a magnetic field therearound, the time periods between activation intervals being substantially greater than the activation intervals.

These and other objects of the invention will become more readily apparent from the ensuing specification when taken together with the drawings.

DETAILED DESCRIPTION OF THE PREFERRED EMBODIMENT

Figure 1:
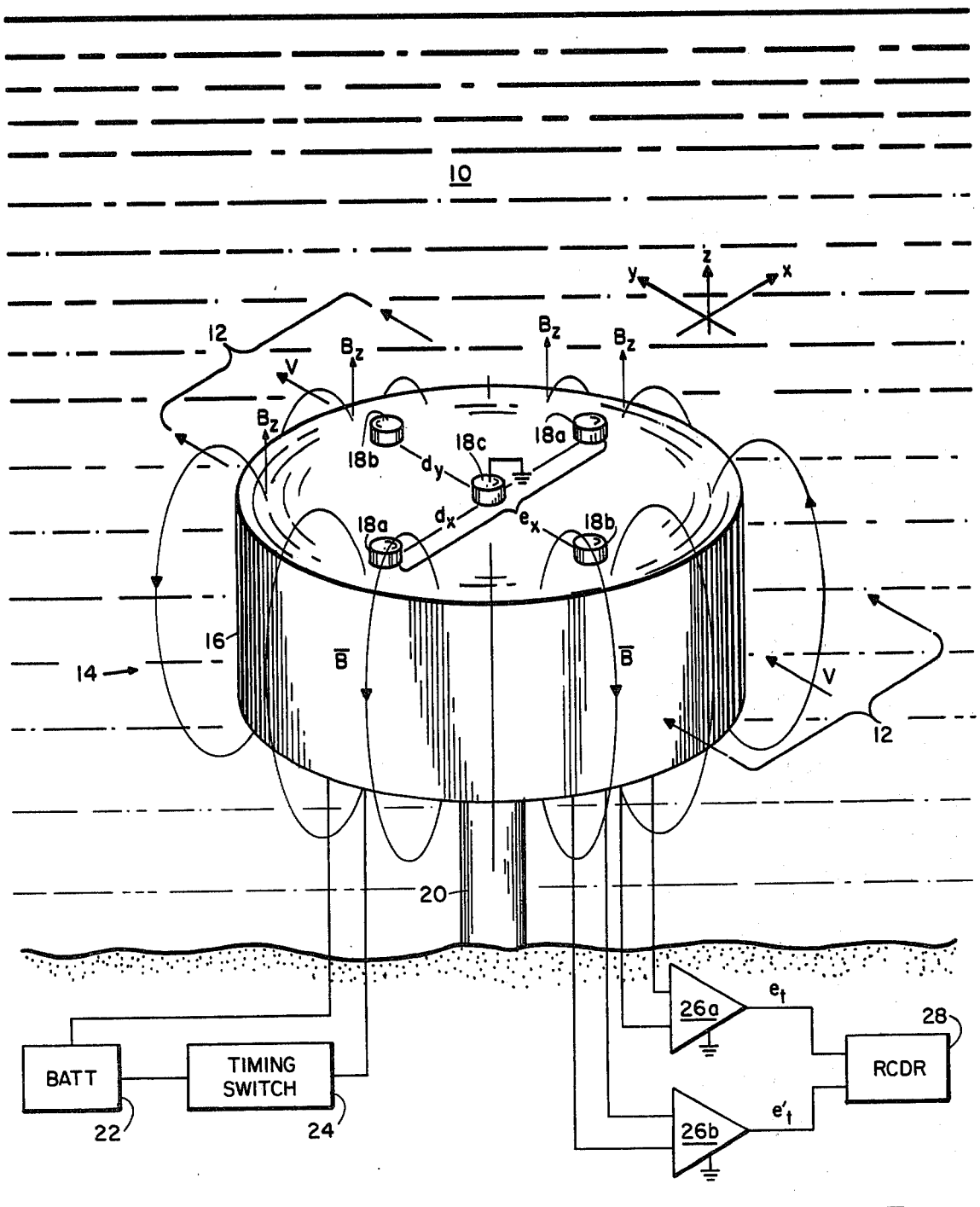
FIG. 1 is a perspective view showing an embodiment of the invention deployed to monitor the velocity of a current flowing within a body of conductive fluid.

Referring to FIG. 1, there is shown a body of conductive fluid 10, such as an ocean body, a current 12, such as a bottom current, flowing therethrough. In order to monitor the velocity V of current 12, a flowmeter 14 is fixed within the current for a long period of time, which may be on the order of weeks, months or in excess of a year. Flowmeter 14 may comprise one of the instruments in a package of instruments (not shown) which are placed within current 12 to gather data on various current parameters.

Flowmeter 14 includes a magnetic field generator 16, upon which are mounted pairs of electrodes 18a, and 18b, electrodes 18a and 18b being in continual contact with conductive fluid 10 during the velocity monitoring period. Electrodes 18a are spaced apart a specified distance $d_x$, a line passing therebetween lying on an x-axis. Similarly, electrodes 18b are spaced apart a distance $d_y$, a line passing therebetween being orthogonal to the line passing between the electrodes 18a and lying on a y-axis. If current 12 is a bottom current, generator 16 may be supported upon a mounting 20. An electrode 18c, centrally spaced between electrodes 18a and b, is connected to ground.

Magnetic field generator 16 generates a magnetic field B having a component $B_z$ which is orthogonal both to a line between electrodes 18a and a line between electrodes 18b. From Faraday's Law, the conductive fluid moving through the magnetic field generates a potential difference $e_x$ between the two electrodes 18a, and a potential difference $e_y$ between the electrodes 18b. From the relationship $E = V \times B$, $e_x = V_y B_z d_x$ and $e_y = V_x B_z d_y$, where $V_x$ and $V_y$ are the components of current velocity along the x and y axes, respectively. Power for the magnetic field is provided in part by battery 22, which is selectively coupled to flowmeter 14 by timing switch 24 in a manner hereinafter described in greater detail.

In light of the above, total potential difference $e_t$ between electrodes 18a is $e_t = e_x + e_\delta = V_y B_z d_x + e_\delta$, where, as aforementioned, $e_\delta$ is the potential difference created between electrodes 18a as a result of electrical interaction between electrodes 18a and conductive fluid 10. $e_t$ is readily measurable by coupling each of the electrodes 18a to an input of a differential amplifier 26a, the output thereof being a voltage $e_t$. In like manner, electrodes 18b are coupled to the inputs of a differential amplifier 26b so that the output of differential amplifier 26b is $e_t'$, the total potential difference between electrodes 18b.

In order to monitor current 12 over a long period of time, a recorder 28 is provided for receiving the outputs of amplifiers 26a and b during the period. The velocity component $V_y$ at a particular time during the period may be determined from the value of $e_t$ recorded for the particular time, according to the above equation, if error term $e_\delta$ can also be determined. A constant $K = B_z d_x$ may be determined, prior to deployment of flowmeter 14 in fluid 10, by performing experiments on flowmeter 14 in a tow tank, according to conventional procedures.

Figure 2:
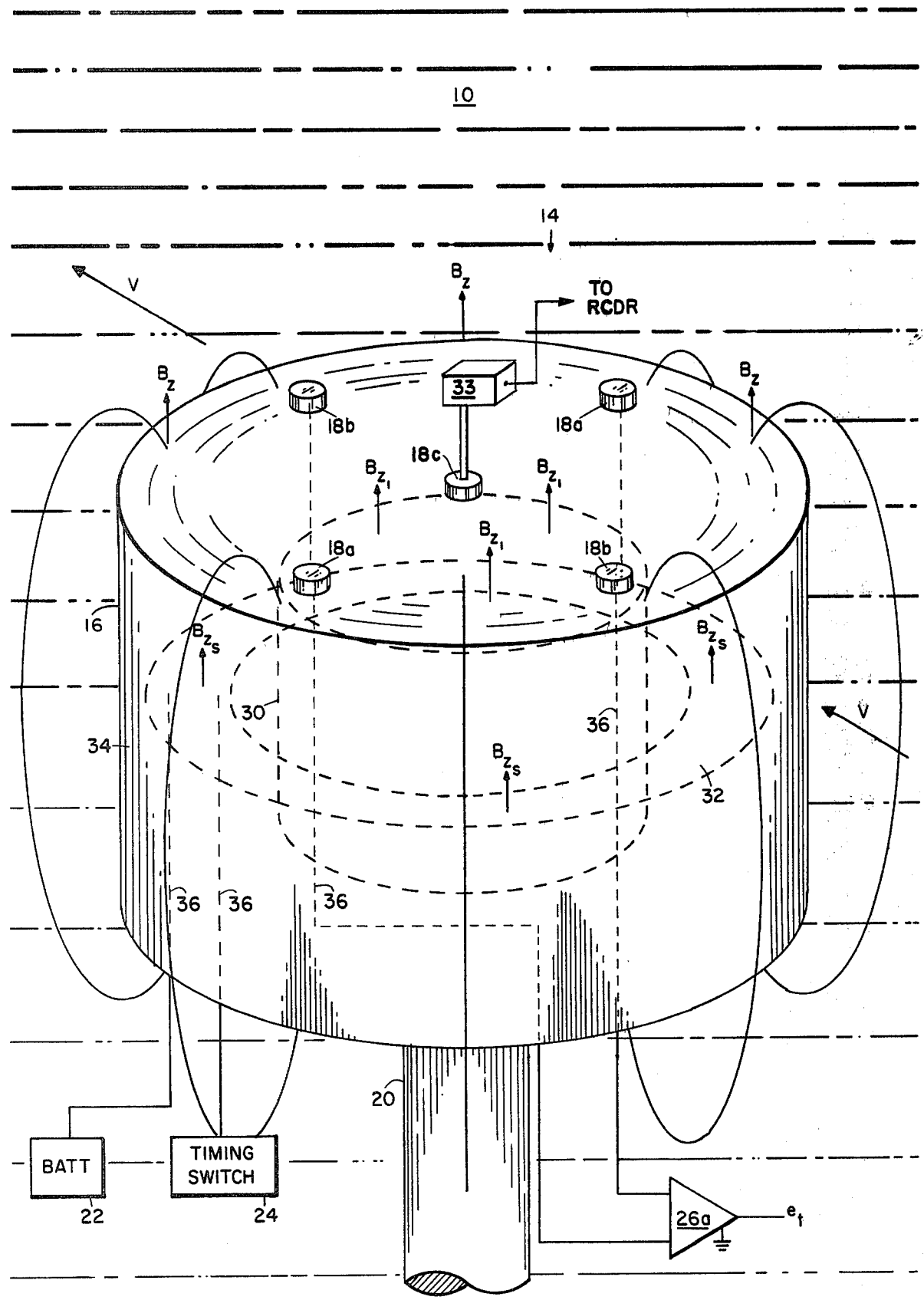
FIG. 2 is a perspective view showing the embodiment of FIG. 1 in greater detail.

Referring to FIG. 2, there is shown a permanent magnet 30 contained within magnetic field generator 16 for generating a magnetic field $B_{z1}$. Permanent magnet 30 is designed so that magnetic field $B_{z1}$ remains substantially constant during a period over which current velocity V also remains constant. The magnitude of $B_{z1}$ remains sufficiently great during the velocity monitoring period to generate a potential difference $e_{x1} = V_y B_{z1} d_x$ which is detectable by amplifier 26a. It will be readily apparent that when $B_z = B_{z1}$, $e_{t1}$, the total potential difference between electrodes 18a is $e_{t1} = e_{x1} + e_\delta$. It will be further apparent that no power source is required to operate flowmeter 14 when the only magnetic field employed thereby is $B_{z1}$.

Referring further to FIG. 2, there is shown a circular electromagnetic coil 32 positioned in relation to permanent magnet 30 so as to generate a supplementary magnetic field $B_{zs}$ whenever electromagnetic coil 32 is activated, by closing timing switch 22 to connect battery 22 to coil 32 for a time period $T_2$. The total magnetic field $B_z$ thereupon becomes $B_{z2}$, $B_{z2} = B_{z1} + B_{zs}$, and $e_t$ becomes $e_t = e_{t2} = V_y B_{z2} d_x + e_\delta$. When switch 22 is opened, $B_z$ returns to $B_z = B_{z1}$, for a time period $T_1$.

From the above equations for $e_{t1}$ and $e_{t2}$, respectively, it is found that $e_\delta = e_{t1} - B_{z1}(e_{t1} - e_{t2})/(B_{z1} - B_{z2})$. $e_\delta$ during a time interval $(T_1 + T_2)$ may therefore be calculated from the output of amplifier 26a stored in recorder 28 during the interval, and from values of $B_{z1}$ and $B_{z2}$ which are pre-determined by means of a conventional flow tank procedure. Alternatively, magnetic fields $B_{z1}$ and $B_{z2}$ may be determined by placing a fluxmeter device 33 proximate to flowmeter 14, and to magnetic fields $B_{z1}$ and $B_{z2}$, during the period that current velocity V is monitored. The output of the fluxmeter would comprise signals respectively representing $B_{z1}$ and $B_{z2}$, such output being usefully recorded by recorder 28, along with the outputs of amplifiers 26a and 26b, during the current monitoring period. From a knowledge of $e_\delta$, $V_y$ may be readily determined.

In like manner, data provided by differential amplifier 26b during a time interval $(T_1 + T_2)$ may be employed to determine the value of $V_x$ thereduring.

A casing 34 of arbitrary nature encloses permanent magnet 30 and electromagnetic coil 32, and provides a mounting for electrodes 18a, b and c. Magnet 30 and coil 32 are fixed in spaced relationship, coil 32 surrounding magnet 30 and having a center coincident with the center of magnet 30. While FIG. 2 shows casing 34 to have a cylindrical configuration, an elliptical or other hydrodynamic shape could be employed to minimize interference of current flow when flowmeter 14 is deployed therein. Electrical paths 36 from electrodes 18a and b pass through casing 34 and are coupled respectively to differential amplifiers 26a and b.

Figure 3:
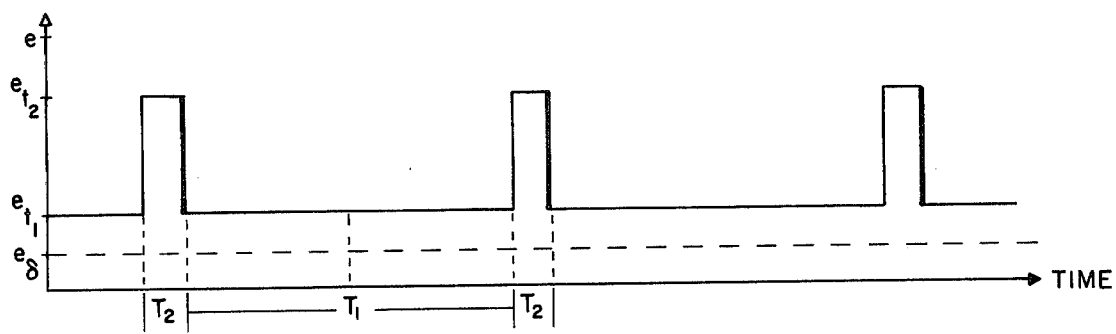
FIG. 3 is a diagram illustrating the operation of the timing switch of the embodiment of FIG. 1.

Referring to FIG. 3, there is shown a diagram which illustrates the comparative lengths of time periods $T_1$ and $T_2$. In determining error term $e_\delta$ according to the above equations, the relative lengths of $T_1$ and $T_2$ are unimportant. Consequently, timing switch 24 is structured so that $T_1$ is on the order of 8 to ten hours, whereas $T_2$ is on the order of 1 minute. The power taken from battery 22 for magnetic field generation is therefore very slight, maximizing the length of time during which a single battery 22, or other power source, can be employed for the operation of flowmeter 14. Also, it will be noted that the voltage levels $e_{t1}$ and $e_{t2}$ are arbitrary, as long as they are different. Consequently, it does not matter whether the polarity of the magnetic field $B_{zs}$ is the same as, or different from, polarity of field $B_{z1}$. $B_{z1}$ may be either less than or greater than field $B_{z2}$, whereby $e_{t1}$ may be either greater or less than $e_{t2}$.

Figure 4:
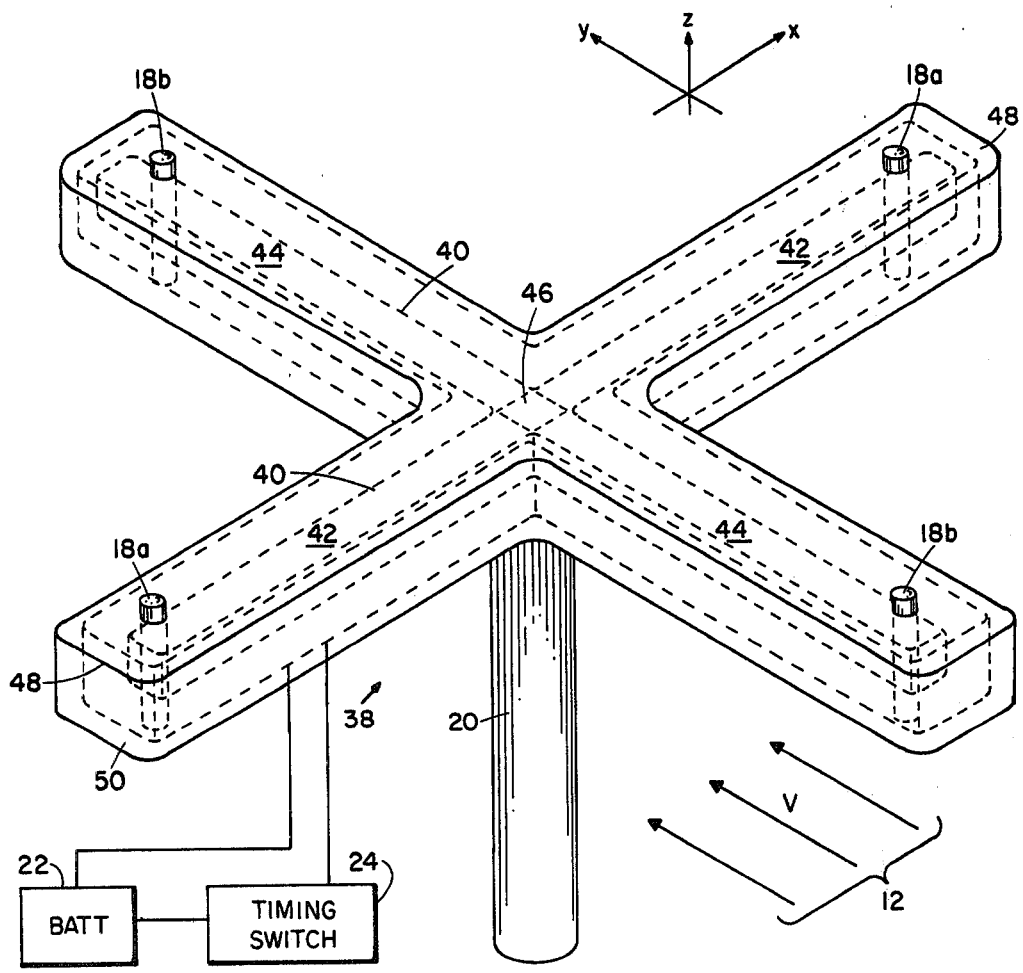
FIG. 4 is a perspective view showing a modification of the embodiment of FIG. 1.

Referring to FIG. 4, there is shown a modification 38 of flowmeter 14, which is intended to enable determination of fluid velocity components along two mutually orthogonal axes, while minimizing the surface area of the flowmeter which interferes with current 12. In the modification, a permanent magnet 40 is provided which has an x-shaped cross-section, and comprises a first elongated member 42 and a second elongated member 44. Members 42 and 44 lie along orthogonal x and y axes, respectively, and share a common central portion 46. An electrode 18a is positioned proximate to each end of member 42 and an electrode 18b is positioned proximate to each end of elongated member 44. A electromagnetic coil 48 is provided, which has an x-shaped cross-section and surrounds permanent magnet 40 in fixed spaced relationship. Coil 48 is selectively activated and deactivated by the operation of battery 22 and timing switch 24, as hereinbefore described. Magnet 40 and coil 48 are enclosed in a casing 50, upon which electrodes 18a and b are mounted.

Obviously, many modifications and variations of the present invention are possible in the light of the above teachings, and, it is therefore understood that within the scope of the disclosed inventive concept, the invention may be practiced otherwise than specifically described.

What is claimed is:

1. Flowmeter apparatus comprising:
   a selected number of electrodes for contacting a moving body of conductive fluid, two of said electrodes, comprising an electrode pair, being spaced a selected distance from one another;
   permanent magnet means for generating a magnetic field having a component in orthogonal relationship with a line passing between the electrodes of said pair;
   electromagnetic means for selectively varying said orthogonal magnetic field component;
   operating means coupled to said electromagnetic means for activating said electromagnetic means during each period in a series of first time periods to establish said magnetic field component at a first level, and for deactivating said electromagnetic means during each period in a series of second time periods to establish said magnetic field component at a second level, the ratio of one of said first time periods to one of said second time periods being less than one; and
   means coupled to the electrodes of said pair for generating first signals during said first time periods and second signals during said second time periods, said first and second signals enabling determination of the potential difference between the electrodes of said pair which occurs when said electrodes are in contact with said fluid and said orthogonal magnetic field component is null.

2. The apparatus of claim 1 wherein:
   the electrodes of said pair are immovably positioned in relation to the velocity of said moving body of conductive fluid so that a component of said velocity is orthogonal to said line passing between the electrodes of said pair;
   said permanent magnet means comprises a permanent magnet of selected configuration which is fixed in selected relationship with the electrodes of said pair to generate said magnetic field component so that said magnetic field component, said velocity component and the line between the electrodes of said pair are mutually orthogonal;

said electromagnetic means comprises an electromagnetic coil proximate to said electrodes for selectively providing a supplementary magnetic field, a component of said supplementary field being orthogonal both to said velocity component and said line;

voltage source means for selectively coupling a voltage to said electromagnetic coil;

timing switch means for connecting said electromagnetic coil and said voltage source during each of said first time periods, and for disconnecting said coil and said source during each of said second time periods, the duration of said second time periods being substantially greater than the duration of said first time periods;

means coupled to the electrodes of said pair for providing a first voltage during one of said first time periods and a second voltage during one of said second time periods; and means receiving said first voltage and said second voltage for enabling determination of the magnitude of said velocity component.

3. The apparatus of claim 2 wherein:

said electrodes comprise means which are deployable in the path of a current flowing through a selected salt water environment;

said timing switch means comprises means for connecting said electromagnetic coil and said voltage source for first time periods which are on the order of a minute, and for disconnecting said coil and said source for second time periods which are on the order of a plurality of hours; and said voltage source comprises a battery means for storing sufficient power to activate said electromagnetic coil during each first time period in a series of first time periods continuing over a current monitoring time period having an upper limit on the order of a year, said battery means being deployable in said salt water environment during said current monitoring time period.

4. The apparatus of claim 3 wherein:

said apparatus includes fluxmeter means proximate to said magnetic field component for generating an output signal representing the strength of said magnetic field component during said current monitoring time period.

5. The apparatus of claim 4 wherein:

said apparatus includes recorder means for storing a first voltage provided during a given one of said first time periods, a second voltage provided during a second time period adjacent to said given first time period, and the output signal of said fluxmeter during said given first time period and said adjacent second time period to provide a set of data from which the magnitude of said velocity component is determinable.

6. The apparatus of claim 2 wherein:

said electrodes comprise first and second electrode pairs, said first pair being immovably positioned in relation to the velocity of said moving body of conductive fluid so that a first component of said velocity is orthogonal to a line passing between the electrodes of said first pair, said second pair being immovably positioned in relation to said velocity so that a second component of said velocity is orthogonal to a line passing between the electrodes of said second pair;

said permanent magnet is positioned in relation to said electrodes to generate magnetic field components which are in orthogonal relationship with said first and second velocity components and with the lines passing between the electrodes of said first and second electrode pairs;

said electromagnetic coil comprises means for providing a supplementary magnetic field component which is parallel to each magnetic field component provided by said permanent magnet; and said timing switch means comprises means for alternately connecting and disconnecting said electromagnetic coil and said voltage source so that two of said first time periods of said series are separated by one of said second time periods.

7. The apparatus of claim 6 wherein:

said electromagnetic coil is configured to surround and to be concentric with said permanent magnet.

8. The apparatus of claim 7 wherein:

said permanent magnet is provided with a circular cross section; and said electromagnetic coil comprises a circular coil surrounding said permanent magnet in fixed spaced relationship.

9. The apparatus of claim 7 wherein:

said permanent magnet is provided with an x-shaped cross section, and comprises first and second elongated members having a common central portion, said first and second members being in orthogonal relationship;

each of the electrodes of said first electrode pair is positioned proximate to an end of said first elongated member, and each of the electrodes of said second pair is positioned proximate to an end of said second member;

said electromagnetic coil comprises a single electromagnetic coil having an x-shaped cross section and surrounding said permanent magnet in fixed spaced relationship; and said apparatus includes means for encasing said permanent magnet and said coil to provide a structure presenting relatively little interference to the movement of said conductive fluid.

10. A method for determining velocity of a current flowing through a selected fluid environment comprising the steps of:

placing a pair of electrodes in contact with said fluid so that if a straight line is passed between said electrodes, said straight line is orthogonal to a component of said velocity, said electrodes being spaced apart at a fixed selected distance;

deploying a permanent magnet means to generate a magnetic field such that said straight line, said velocity component and a component of said generated magnetic field are mutually orthogonal;

activating an electromagnetic coil for a first time period to generate a supplementary magnetic field which is orthogonal both to said straight line and to said velocity component, and deactivating said electromagnetic coil for a second time period, said first time period being substantially less than said second time period;

determining the potential difference between said electrodes during said first time period, determining the potential difference between said electrodes during said second time period, and determining at a selected time the strength of said magnetic field component during said first and second time periods; and employing said determined potential differences and magnetic field strengths, together with said spacing distance of said electrodes, to determine the magnitude of said velocity component.

11. The method of claim 10 wherein said method comprises a method for determining the velocity of a current flowing through a selected body of salt water, and wherein:

said activating step comprises the step of activating said electromagnetic coil during each first time period in a series of first time periods which are on the order of one minute, first time periods being separated by second time periods which are on the order of a plurality of hours.

12. The method of claim 11 wherein:

said permanent magnet means comprises means for generating a magnetic field which remains constant during a given one of said first time periods and a second time period adjacent to said given first time period; and said activating step comprises the step of generating a supplementary magnetic field to increase said magnetic field component during said given first time periods.

13. The method of claim 11 wherein:

said permanent magnet means comprises means for generating a magnetic field which remains constant during a given one of said first time periods and a second time period adjacent to said given first time period; and said activating step comprises the step of generating a supplementary magnetic field to decrease said magnetic field component during said given first time periods.

* * * * *